March 29, 1966 R. R. BURLEY 3,243,503
WIRING TROUGH HAVING HINGED OR COMPLETELY REMOVABLE COVER
Filed Aug. 9, 1963 2 Sheets-Sheet 1
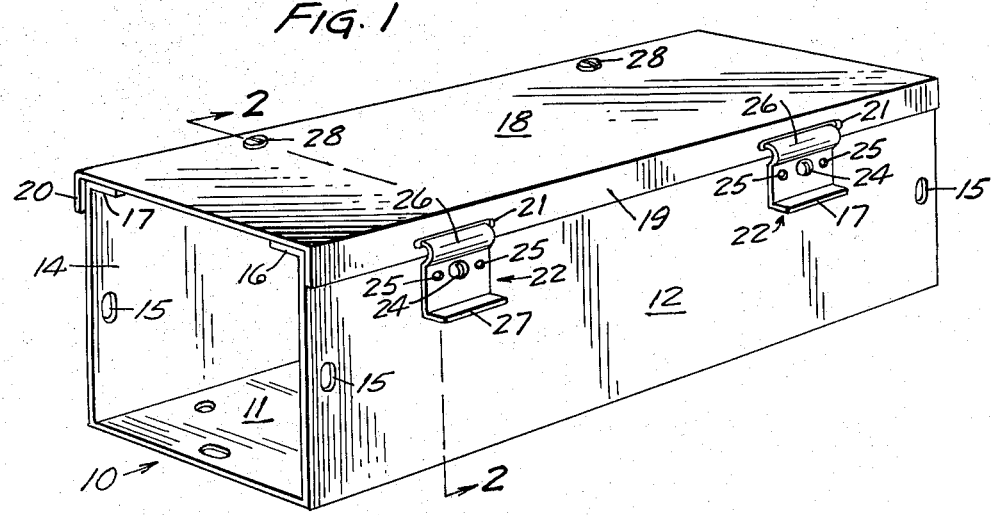
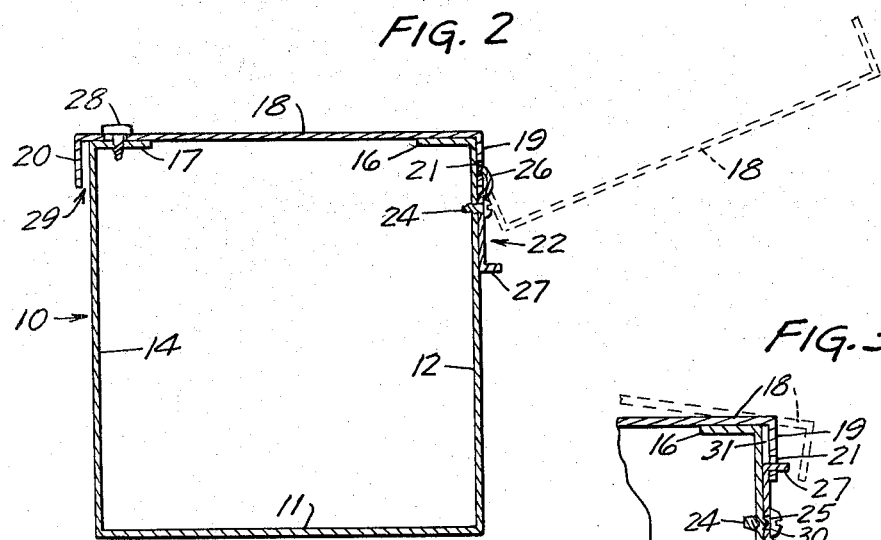
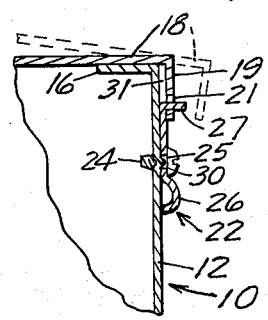
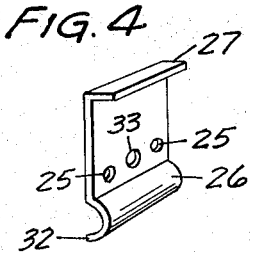
INVENTOR
RONALD R. BURLEY
BY Moore, White & Burd
ATTORNEYS March 29, 1966  R. R. BURLEY  3,243,503
WIRING TROUGH HAVING HINGED OR COMPLETELY REMOVABLE COVER
Filed Aug. 9, 1963  2 Sheets-Sheet 2
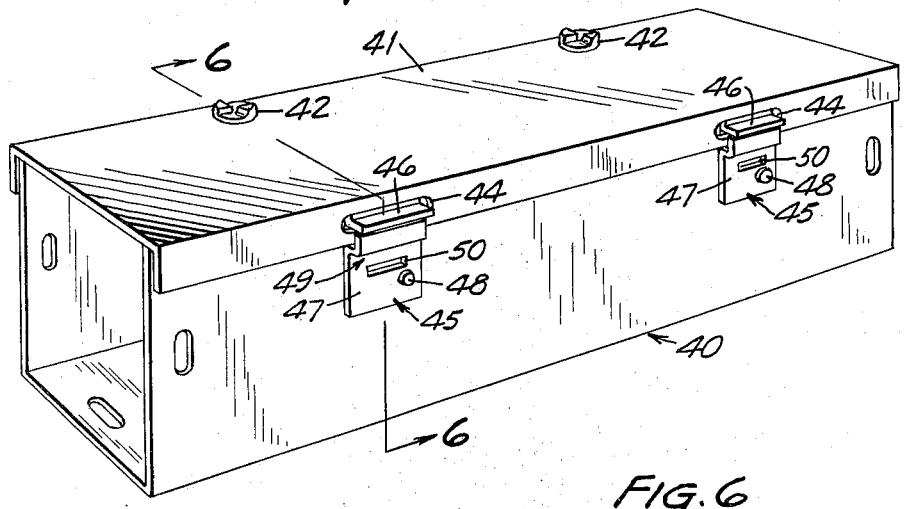
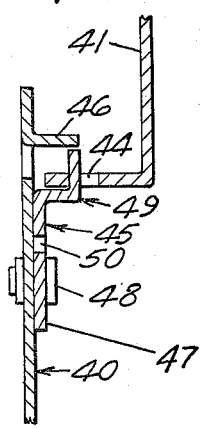
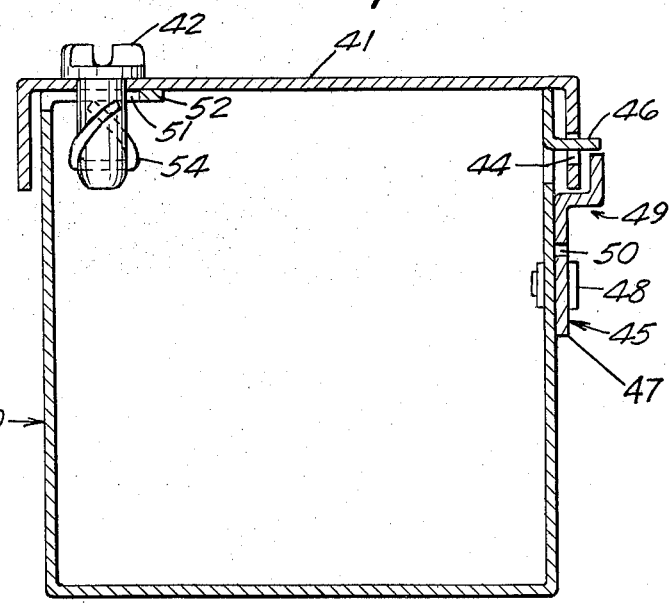
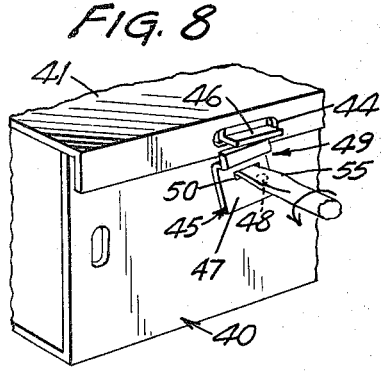
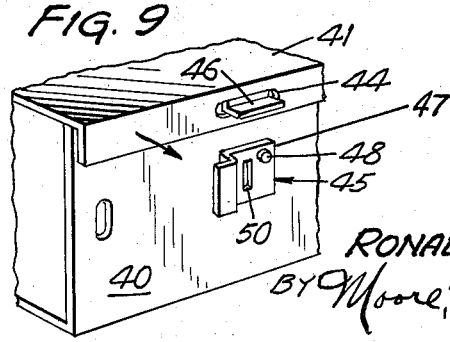
INVENTOR
RONALD R. BURLEY
BY Moore, White & Burd
ATTORNEYS

United States Patent Office

3,243,503
Patented Mar. 29, 1966

3,243,503
WIRING TROUGH HAVING HINGED OR COMPLETELY REMOVABLE COVER
Ronald R. Burley, Anoka, Minn., assignor to Hoffman Engineering Corporation, Minneapolis, Minn., a corporation of Minnesota
Filed Aug. 9, 1963, Ser. No. 301,053
6 Claims. (Cl. 174—101)

This invention is an electrical trough or auxiliary wiring gutter that may be used either as the so-called screw on lid type trough or the hinged lid type trough.

In general, wiring trough, or auxiliary wiring gutter as it is referred to by the Underwriters Laboratories, has been either the hinge type lid or screw type. In the hinge type, the lid is hinged to the three sided trough portion and may be opened for installation, inspection or repair of the wires by simply unfastening the unhinged side and hinging it open like a tool chest. With the screw on type, both sides of the lid are secured but releasable to allow complete removal of the lid. While the exact nature of the hinges used on hinged type trough has varied from manufacturer to manufacturer, they invariably are what might be referred to as a permanent type hinge. That is, they are either stamped and bent out of the material of the trough or in the alternative a separate hinge member welded to the trough and cover.

Under some circumstances, however, the so-called hinge lid is unsatisfactory and for this reason the screw on lid is made. In this form of structure the lid or top may be completely removed from the trough and thereby moved out of the way when desired. The hinge lid is desirable in that the lid does not become separated from the trough and it is probably less likely to become damaged in the course of working on the structure. The screw lid on the other hand provides more ready access to the interior of the trough and some electricians prefer it. For this reason, manufacturers have heretofore been forced to make both types of troughs and suppliers in turn have had to carry dual stocks providing both screw on and hinge type troughs in order to meet all demands.

Accordingly, it is the principal object of this invention to provide a novel wiring trough or auxiliary gutter.

It is a further object of this invention to provide a single wiring trough structure that is convertible to either the screw on type lid or the hinge type lid.

It is yet another object of this invention to provide such a structure that can be easily switched from one form to the other so that it is possible for a trough to be changed from one form to the other after it is installed if circumstances change so as to render the other form more desirable at a later date.

It is still a further object of this invention to provide a convertible conduit trough or auxiliary wiring gutter that will satisfy demands for both principal types of closures and thereby permit distributors to carry only a single stock of troughs.

It is yet a further object of this invention to provide an auxiliary wiring trough or gutter that is quickly or readily convertible and requires no skill or knowledge on the part of the person making the conversion.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 1 is a perspective view of a section of trough with the clips thereof adjusted as to provide a hinge top closure;

FIGURE 2 is a sectional view of the trough shown in FIGURE 1 taken on the line and in the direction of the arrows 2—2 and with broken lines illustrating an adjusted position of the lid; it is drawn to a scale larger than FIGURE 1;

FIGURE 3 is an enlarged fragmentary view of the clip portion and adjacent trough wall illustrating its adjustment to the position which permits the lid to be removed entirely, which action is illustrated in broken lines; this figure is drawn to a larger scale than FIGURE 2;

FIGURE 4 is a perspective view of one of the clips illustrating its structure and drawn to a scale larger than that of FIGURE 3;

FIGURE 5 is a perspective view similar to FIGURE 1 but showing a modified form of the invention using a split-type clip;

FIGURE 6 is a view taken on the line and in the direction of the arrows 6—6 of FIGURE 5 and drawn to an enlarged scale;

FIGURE 7 is a fragmentary view of structure as seen in FIGURE 6 illustrating how the clip serves as a hinge and drawn to the same scale as FIGURE 6;

FIGURE 8 is a fragmentary view of a trough and one of the clips drawn to a smaller scale than FIGURE 5 and shown in an intermediate stage of being converted from a hinge to a lug; and FIGURE 9 shows the structure illustrated in FIGURE 8 with the conversion completed.

Referring to the drawings and specifically to FIGURE 1, there is illustrated generally one form of the invention in which the trough member 10 comprises a bottom 11 and upturned sides 12 and 14. Openings as shown illustratively at 15 are provided to secure one trough section to the next or the trough to supports. The trough may be provided at the top edges of the walls 12 and 14 with the flanges 16 and 17 respectively.

The top is designated 18 and it has the downturned flanges 19 and 20 which embrace the outer upper edges of the side walls 12 and 14 respectively. Flange 19 is provided with slots as shown at 21 which are engaged by a portion of the clip generally designated 22.

Clip 22 is secured to side wall 12 in any suitable manner that permits it to be loosened and rotated and in this illustration is shown the cap screw 24 which secures the clip at the center. At the sides of the screw 24, which goes through an appropriate opening in clip 22, may be seen the aligning holes such as the one designated 25. These holes embrace appropriately formed dimples in the side wall 12 so that the clip may be quickly and easily placed and held in a given predetermined relationship with respect to the trough 10 with the single screw 24. As shown in FIGURE 1, the clip is arranged with its semi-cylindrical hinge forming portion 26 engaging the slots 21. The outer end of the clip is a bent out lug portion 27, the use of which will be described hereafter. The top or lid is secured closed with any suitable fasteners such as the screw type fasteners 28 here shown as engaging appropriate structure in flange 17 to hold down the portion of the lid adjacent to flange 20.

In FIGURE 2 the lid 18 is shown in the hinged open position in broken lines. In order to hinge the lid open, of course, the securing screw type fasteners 28 must be released.

In FIGURE 2 also, there is shown a slight clearance at 29 between the flange 20 and the portion of wall 14 adjacent to flange 17. The reason for this is the necessity for the lid 18 bridging the thickness of clips 22 whenever the lugs 27 are used for fastening the cover. This will be described in more detail with reference to FIGURE 3.

In FIGURE 3, the clip 22 may be seen reversed with the lug portion 27 above and the hinge forming portion 26 below. In this view also, a dimple or detent 30 is shown which is exemplary of all the dimples. They engage holes 25 in clips 22 in both of its operative positions to align outer end 32 or lugs 27 for correct positioning as long as they are held in engagement by screws 24. To remove lid 18 from the trough 10 with the clip 22 secured as shown in FIGURE 3, it is necessary only to loosen the screw type fasteners 28, lift flange 20 clear of flange 17 and then slide the cover or top 18 so that flange 19 moves away from the lug portions 27 until clear, as shown in FIGURE 3. The clearance between a top flange and conduit wall that was at 29 in FIGURE 2 is now seen at 31 in FIGURE 3. This is true because the flange 19 engages the thickness of clips 22 below the lug 27.

In FIGURE 4, the clip is shown by itself. It is important that the outer or free edge 32 of hinge portion 26 be substantially the same distance from the hole 33 for screw 24 as is the lug 27 so that either the outer end portion 32 of hinge portion 26 or the lug 27 will properly engage slot 21 in lid 18. Holes 25 will be seen to align with hole 33 so that they may engage dimples 30 in either position of the clip 22.

Referring to FIGURE 5, there is shown a modified form of the invention including a generally similar trough-like member 40 having a bottom and two sides extending at right angles to the bottom. It is very similar to the member 10 shown in FIGURES 1–4. Cover 41 is very similar to cover 18 in FIGURES 1–4 and is distinguished mainly in that it carries the non-removable type fasteners 42. In one edge of cover 41 is formed a slot as seen at 44 which is substantially identical to slot 21 in FIGURE 1. The form of the trough shown in FIGURES 1–4 and 5–9 differ principally in clips employed in holding the lids on the trough members.

In FIGURE 5, may be seen the split clip generally designated 45 and consisting of a tongue member 46 and a pivoting clip portion 47. Portion 47 is pivotally secured to the trough 40 by suitable means such as rivet 48. It has an off-set formed in it as seen at 49 and may be provided with a slot as at 50 to receive an instrument for facilitating pivoting the member 47 about rivet 48.

In FIGURE 6 the structure appears enlarged and in sectional view where the movable clip portion 47 may be seen secured by rivet 48 so that off-set 49 together with tongue 46 forms a loop-like structure extending through slot 44 thus forming a hinge for lid 41.

In order to hinge open the lid 41 of trough 40 it is necessary only to release the fasteners 42. These fasteners are of a standard commercial type which are rotatably held in lid 41 and passed through a suitable slot as shown in 51 in flange 52 of the trough 40. Slot 51 is of sufficient size in one of its dimensions to receive easily the spring 54 of fastener 42. Slot 51, in its other dimension, however, passes very close to the shank of fastener 42 and the upper ends of spring 54 will engage it when fastener 42 is turned to place them adjacent these sides. The angle at which the ends of spring 54 engage portions of flanges 52 adjacent opening 51 is such as to preclude its being turned easily except in one direction. This is a standard purchased type fastener and is not part of this invention per se.

In order to release the trough lid, the fastener 42 is turned 90 degrees from the position in which it is shown in FIGURE 6 and thereupon the ends of spring 54 are placed in the slot 51 and the lid 41 may be hinged open around the loop formed by the tongue 46 and the off-set portion 49 of clip 45.

The position of the portion of the lid embracing the tongue 46 and off-set 49 when hinged open is shown in FIGURE 7.

When it is desired to remove the lid altogether, as for example, if the conduit is in such a position that the lid will not remain hinged open for access, the screw driver is used to change the hinge to a tongue as illustrated in FIGURES 8 and 9.

In FIGURE 8, a fragment of a common bladed screw driver 55 is shown in the slot 50 and the arrow illustrates the direction of pivoting that clip 47 pivots to release it from its hinge forming function. In FIGURE 9 the clip is shown pivoted substantially 90 degrees in a counter-clockwise direction from its hinge forming position and thereafter lid 41 is held down on the righthand side as viewed in FIGURE 6 solely by reason of slot 44 engaging tongue 46.

After the fasteners 42 have been released, lid 41 may be hinged up far enough for its flange adjacent to fasteners 42 to be swung above the left hand side of the trough as seen in FIGURE 6, and thereafter the lid may be moved in the direction of the arrow in FIGURE 9 to disengage the slot 44 from the tongue 46. As soon as the tongue 46 is cleared, the entire lid may be moved away from the trough portion 40 to provide easy access to the interior thereof. The split clips may be returned to the hinge forming function by turning them back in the reverse direction they were turned to form clips.

Tongue 46 is close enough to rivet 48 that in order to turn the clip portion 47 down to the position shown in FIGURE 9, it is necessary to spring the tongue 46 upward slightly. For this reason, the portion 47 of clip 45 stays in whichever position it is placed by the user until it is returned to its opposite position by means of a screw driver as shown in FIGURE 8.

Closing the wireway or auxiliary trough is exactly the reverse of the course of opening it. If the trough is being used as a screw type lid, the lugs 46 are first engaged by the slots 44 and then the lid swung down in the position permitting the fasteners 42 to be secured. A hinged lid is just hinged shut and secured.

With this structure, it is quite clear that a single form of trough or wireway may be constructed and stocked by the wholesaler and yet make a complete line of either hinge covers or screw on type lids available to purchasers.

Furthermore, it is perfectly obvious that even after the troughs have been installed, they can be changed from one form to the other by simply removing the clips and reversing their position with respect to the trough wall 12. For example, perhaps the hinge lid form of trough seems more desirable at the time of installation, but later it becomes apparent that it will be necessary as a result of later modifications of the structure in which the wireway is installed to have a screw on top lid. Before any obstructions are placed in the way, all of the clips 22 or clip portions 47 may be switched to make the lift-off type structure and the same troughs thus changed in character to accommodate themselves to a new situation.

Furthermore, it is possible to use the structure as a hinge type lid but if it is desirable to remove the lid completely at any time, the lids may be removed entirely from the troughs even though it is normally and as a general thing used as a hinge type.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. An improved wireway structure of the type having a trough portion and a cover removably covering said trough portion to make an accessible closed wireway, the improvement comprising: cooperating structure on said trough and cover for movably securing said cover to said trough; said cooperating structure including said cover having slots in it near one edge; clips pivotally secured to said trough and each clip adjustable to two positions about the pivot point; said cooperating structure including lugs; said lugs, when said clips are adjusted about their pivot points to one position, being removably engaged in said cover slots; whereby a demountable relationship is established between said trough and said cover; said clips, when adjusted about their pivot points to their second position, forming in cooperation with an adjacent portion of said trough wall, loops engaged in said cover slots; whereby a hinged relationship is established between said cover and said trough.

2. The improved wireway structure of claim 1 in which said lugs are formed from a portion of said trough wall and said clips have off-set portions which form said loops in conjunction with said lugs and are pivoted away from said lugs selectively.

3. The improved wireway structure of claim 1 in which said lugs are slightly resilient and the associated one of said clips must force one of said lugs to yield for said clips to pivot from said one position to said second position, and said clips have a tool receiving formation therein.

4. The improved wireway structure of claim 1 in which each of said clips has a lug formed at one end thereof and a semicylindrical hinge forming portion at the other end thereof and said clips are each pivotable about a securing point spaced equally from the most remote portion of said semicylindrical hinge forming portion and said lug.

5. The improved wireway structure of claim 4 in which said trough and clips have interacting, cooperating, aligning means thereon; whereby said clips may be quickly and accurately arranged and held in either said one and said second position with a single fastening means.

6. The improved wireway structure of claim 5 in which said aligning means comprises cooperating detent portions on the clips and the trough wall.

References Cited by the Examiner
UNITED STATES PATENTS

| | | | |
|---|---|---|---|
| 2,445,198 | 7/1947 | Wisemann | 174—68 X |
| 2,956,587 | 10/1960 | Fisher | 174—68 X |

FOREIGN PATENTS

| | | |
|---|---|---|
| 657,888 | 2/1963 | Canada. |

ROBERT K. SCHAEFER, *Primary Examiner.*

DARRELL L. CLAY, JOHN F. BURNS, *Examiners.*